Nov. 17, 1953 W. B. LYON 2,659,647
CONVEYING MECHANISM
Filed May 17, 1951 9 Sheets-Sheet 1

Inventor
William Bronson Lyon
By-
Attorney inventor
William Bronson Lyon
By-
Attorney Nov. 17, 1953

W. B. LYON 2,659,647

CONVEYING MECHANISM

Filed May 17, 1951

Inventor
William Bronson Lyon
-By-
Attorney

Inventor
William Bronson Lyon
-By-
Attorney

Nov. 17, 1953  W. B. LYON  2,659,647
CONVEYING MECHANISM
Filed May 17, 1951  9 Sheets-Sheet 7

Inventor
William Bronson Lyon
-By-
Attorney

Nov. 17, 1953 W. B. LYON 2,659,647
CONVEYING MECHANISM
Filed May 17, 1951 9 Sheets-Sheet 8

Inventor
William Bronson Lyon
-By-
Attorney

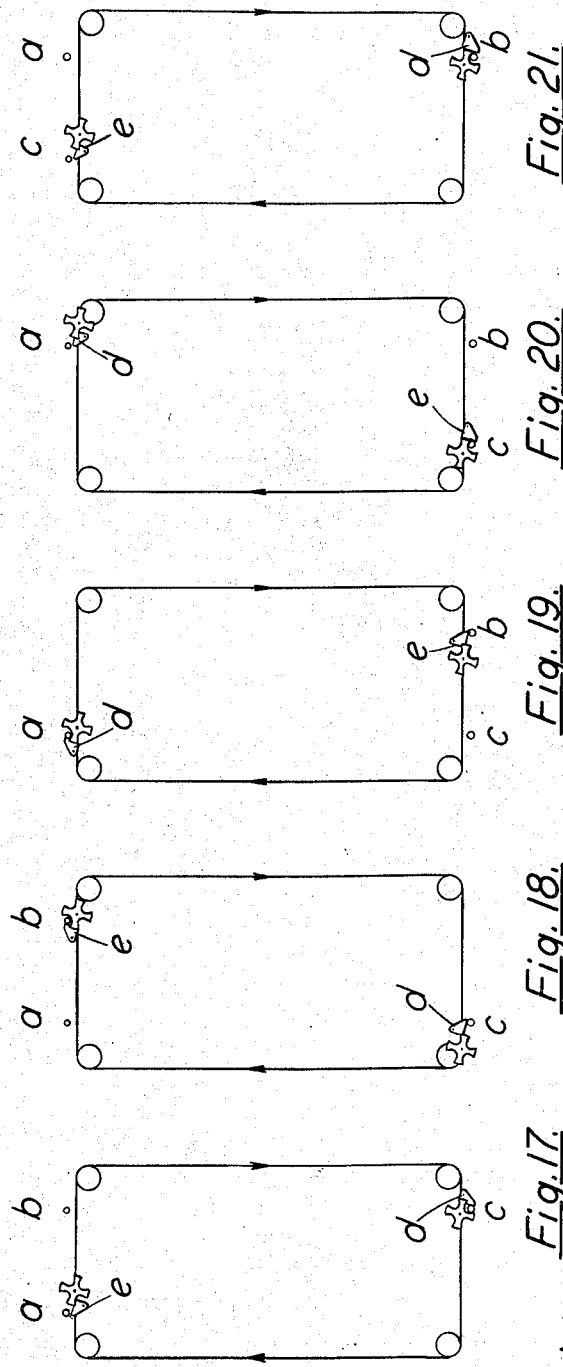

Patented Nov. 17, 1953

2,659,647

UNITED STATES PATENT OFFICE 2,659,647

CONVEYING MECHANISM

William Bronson Lyon, Grand Rapids, Mich.

Application May 17, 1951, Serial No. 226,912

7 Claims. (Cl. 312—234)

1

This invention is an improvement on the invention covered by my co-pending application Serial Number 214,186 filed on March 6, 1951, and entitled "Storage and Display Unit." These inventions provide conveying mechanisms associated with a storage and display cabinet. It is the primary purpose of these cabinets to make available for storage and display purposes substantially all of the volume of space between a floor and ceiling over a given floor area. An opening is present in the cabinet at the floor level to permit attendants and customers to examine and remove merchandise, and the mechanism referred to above moves the contents of the cabinet around a path causing it to pass to and from the floor-level opening.

These cabinets are useful in many ways. They may be adapted to handle retail merchandise of almost any description through varying the type of merchandise containers or supports that are used in conjunction with the shifting mechanism. These cabinets may also be used principally for display purposes, in which it is the primary objective to move as much merchandise as possible before a given display station. In contrast, these cabinets may also be used principally for storage purposes in which it is desired to use as great a volume of space between the floor and ceiling without the necessity of providing ladders and other similar equipment for the use of personnel.

The shifting mechanism utilized by these cabinets consists generally of a pair of related machinery boxes, one of them located at each end of the cabinet. The mechanisms contained within these boxes are related through the action of a power-transfer shaft which maintains the two units in synchronized operation. A suitable motor is provided capable of operating the entire system. Each of the machinery boxes contains a preferably rectangular arrangement of sprockets over which an endless chain operates. This chain carries a set of attachments capable of acting as abutments and engaging a series of rods extending the length of the cabinet, each end of which is operated upon by one of the shifting mechanisms. In the preferred form of the invention, a track system is also provided in each machinery box for establishing the path of movement of the hang rods. The track system and the path of movement of the chain are closely related so that the chain may apply the necessary forces to move the hang rods around the track through engagement of the chain attachments.

2

The improvement provided by the present invention concerns the chain attachments and the structure provided for positioning them in relationship to the hang rods. This structure includes two generally similar sets of chain attachments carried by the chain and positioned at diametrically opposite points thereon. Each of these sets of chain attachments includes a leading attachment (with respect to the direction of movement of the chain) capable of exerting force on the hang rods only in a direction opposite to this direction of chain movement. These leading attachments are adapted to carry the weight of the hang rods and their burden down the lowering section of their path of travel. Slightly behind each of these leading chain attachments is a laterally-movable attachment that is placed to and from position to engage the hang rods through this lateral movement. The lateral positioning of each of these movable engaging members is established by a separate rail, in the preferred form of the invention. In this form of the invention, the laterally-movable chain attachments are of substantially identical design, except for the provision of rail-engaging members disposed to cooperate with the particular rail associated with that engaging member. One rail is disposed on either side of the chain; and accordingly, one attachment will have a projection extending on one side of the chain, and the other attachment will have its projection in the opposite direction. With this arrangement of chain attachments, and this system of actuating them, it becomes possible to provide a path of hang rod travel which is parallel to the path of movement of the chain. In many respects, this feature simplifies the overall structure of the cabinet. Clearance requirements within the cabinet are less complicated, and the problems relating to the relative alignment of the various components of the system are much less critical.

The several features of the present invention will be discussed in detail through an analysis of the embodiments illustrated in the accompanying drawings, in which a cabinet is illustrated that is adapted for accommodating wearing apparel. In these drawings:

Figures 4 and 5 are in projection.

Figures 6 and 7 are in projection.

Figures 8 and 9 are in projection.

Figures 10 and 11 are in projection.

Figure 16:
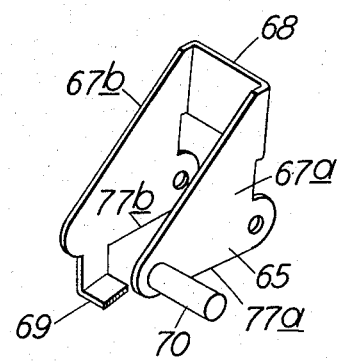
Figure 15:
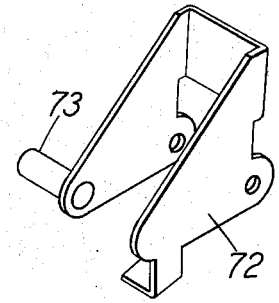

Figures 15 and 16 (see sheet 1) present perspective views on an enlarged scale of the laterally-movable chain attachments.

Figures 17 through 21, inclusive, (see sheet 9) present diagrams showing the various positions of the components of the shifting mechanism during their cycle of operation.

Figure 1:
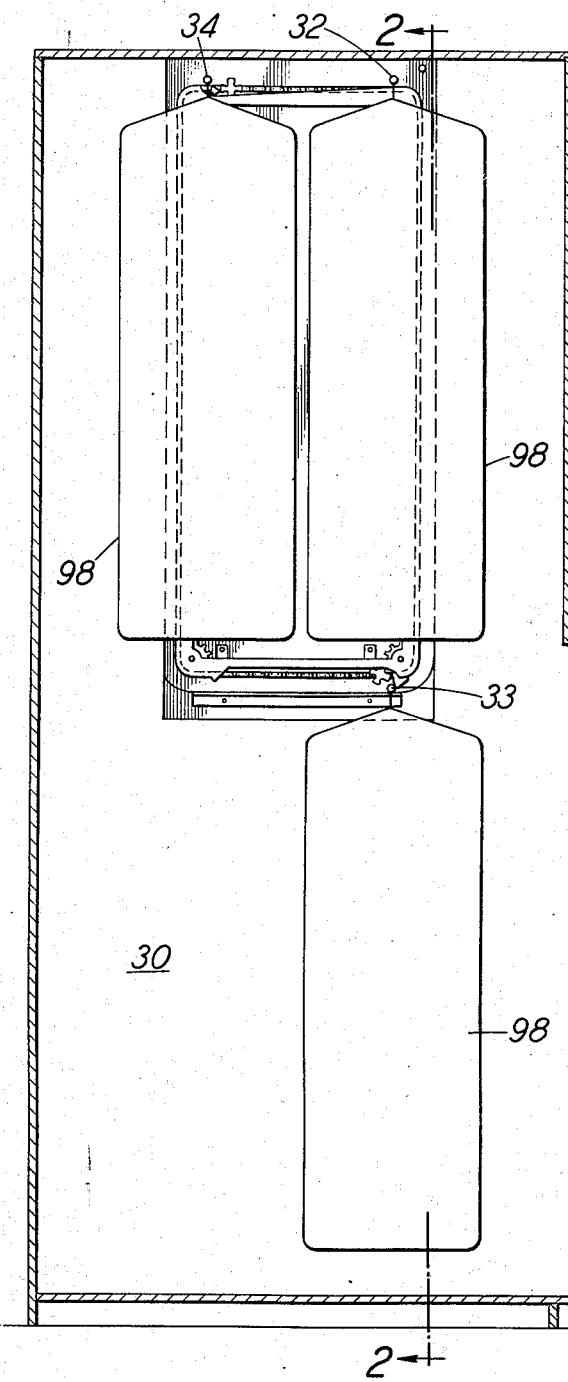
Figure 1 (see sheet 1) is a sectional side elevation through the central portion of a cabinet embodying the present invention.
Figure 2:
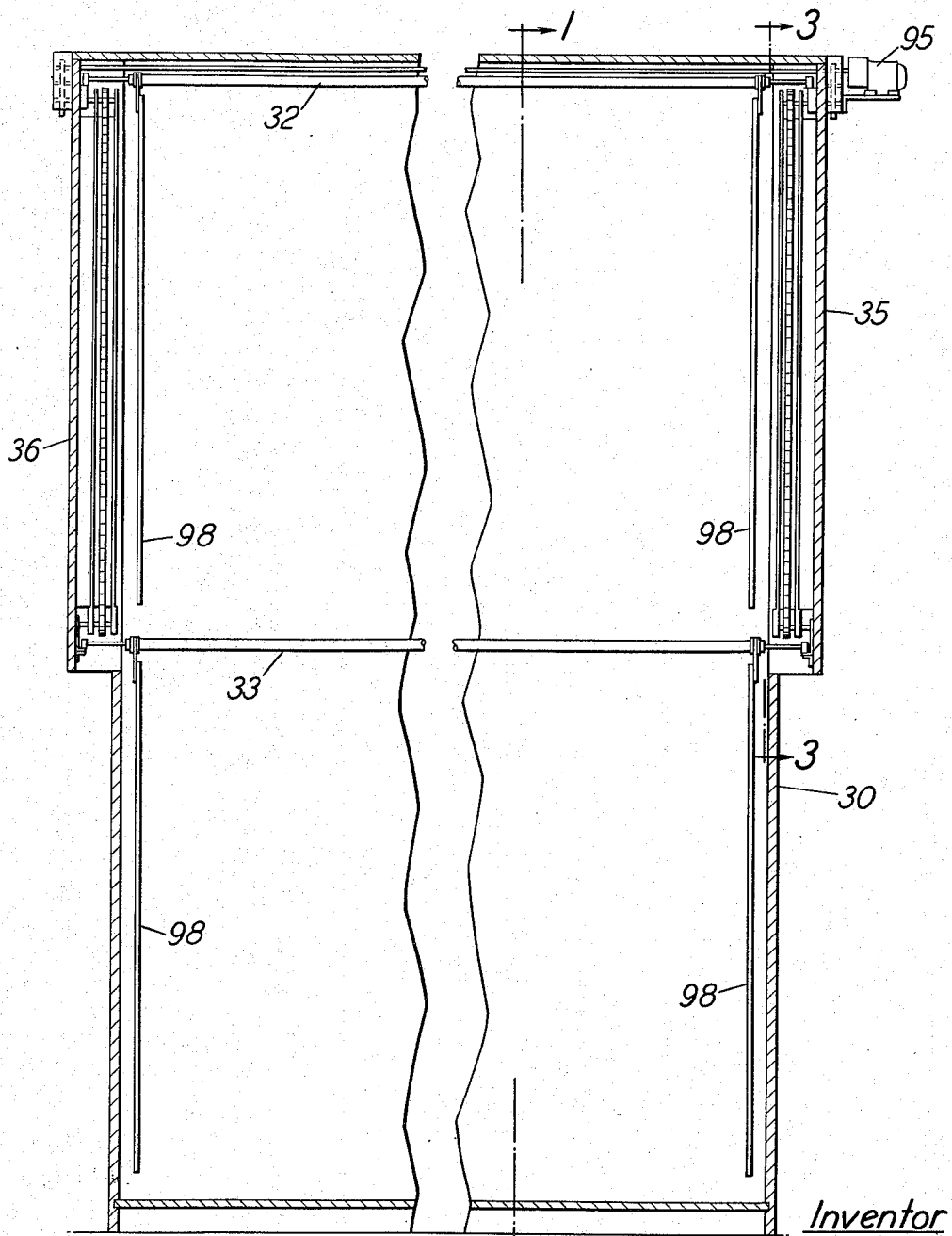
Figure 2 (see sheet 2) is a sectional front elevation through the same cabinet illustrated in Figure 1.
Figure 3:
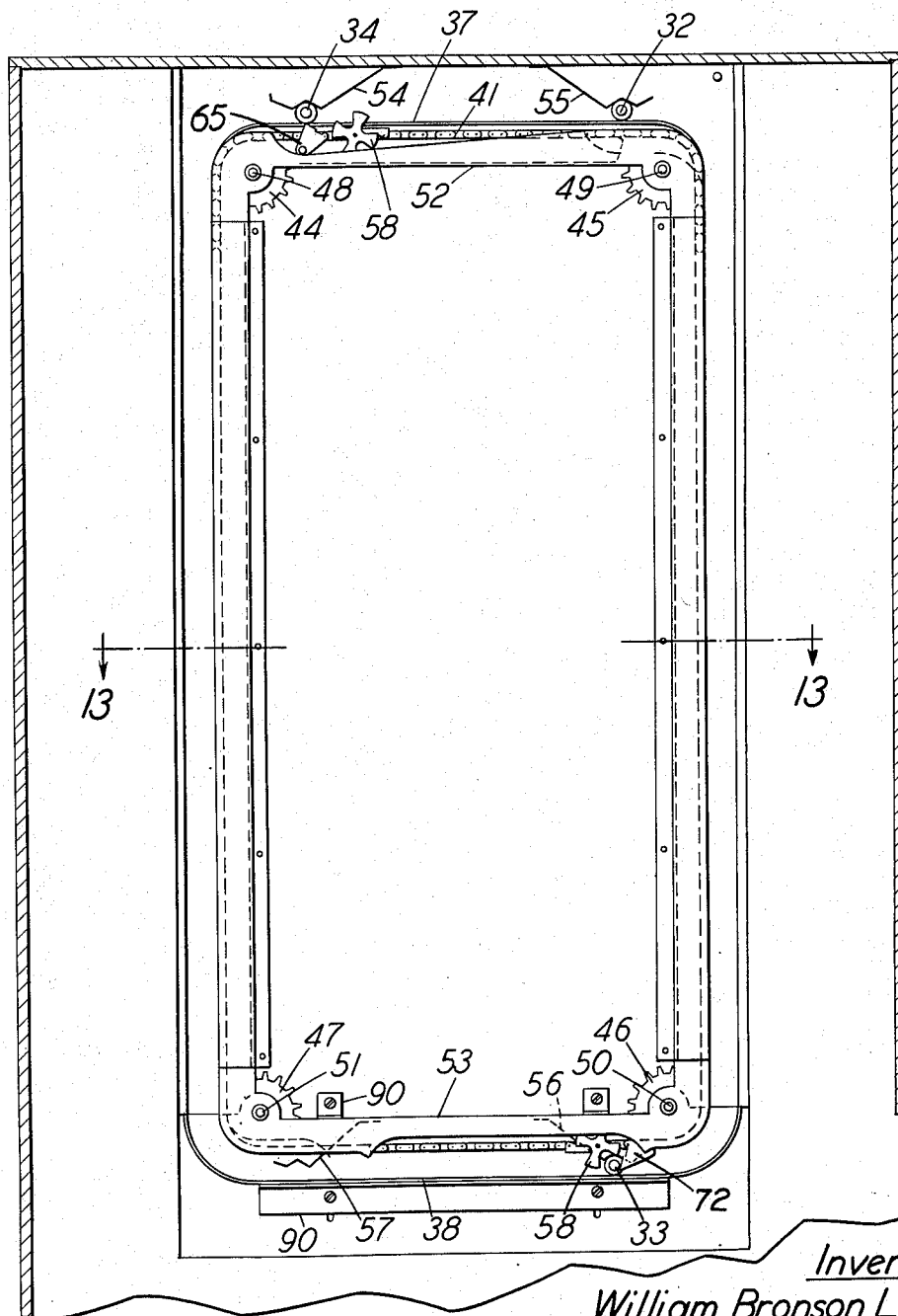
Figure 3 (see sheet 3) is an enlarged section in elevation showing the entirety of the hang rod shifting mechanism as viewed from the interior of the cabinet, and is taken on the plane 3—3 of Figure 2.
Figure 4:
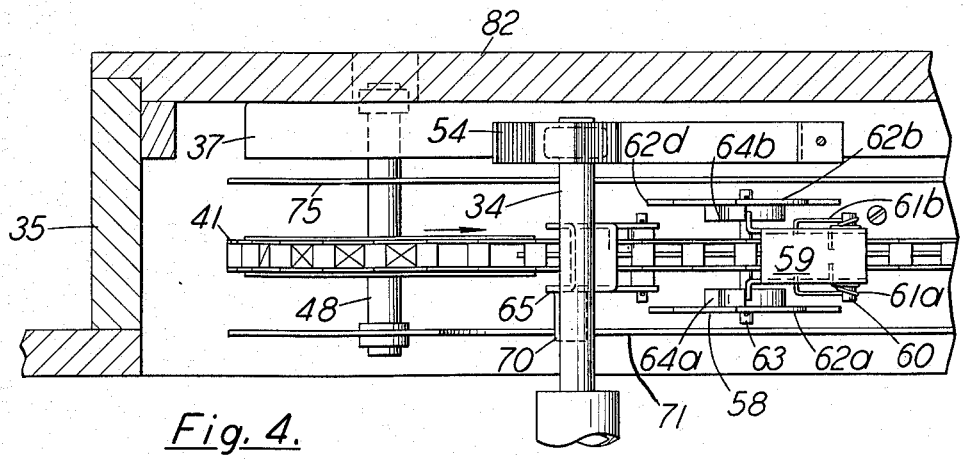
Figure 4 (see sheet 4) is an enlarged top view of the mechanism associated with the upper left corner of the shifting mechanism as shown in Figure 3.
Figure 5:
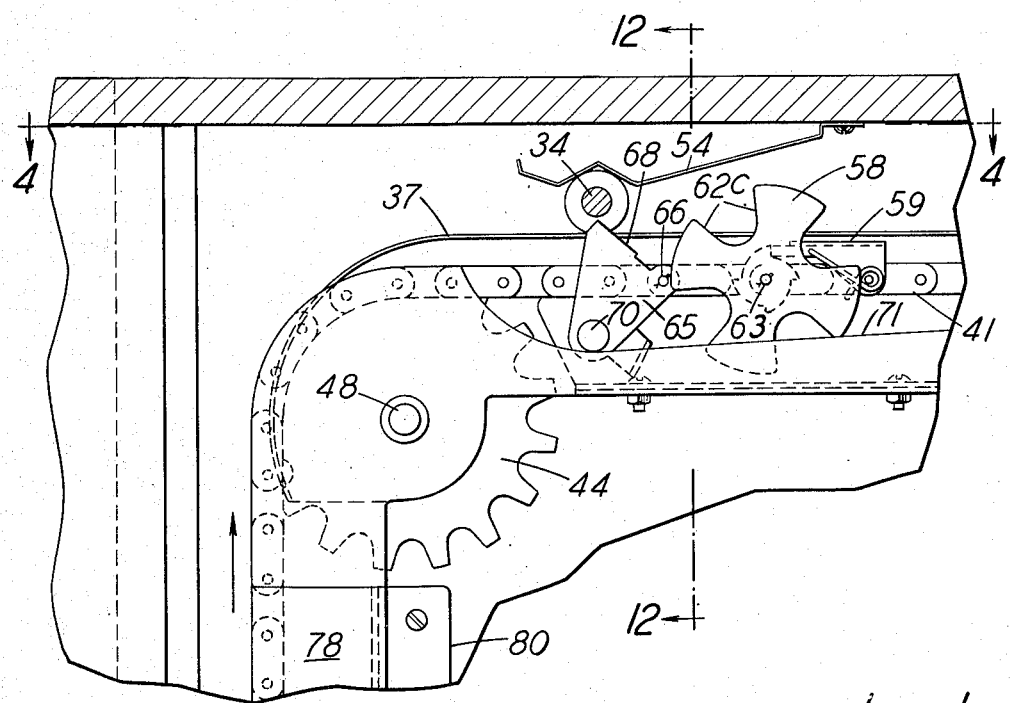
Figure 5 (see sheet 4) is a view in elevation of the same mechanism shown in Figure 4.

Referring to Figures 1 and 2, the display cabinet generally indicated at 30 is provided with the opening 31 at floor level. This opening permits the contents of the cabinet to be examined, inserted, and removed. Wearing apparel is suspended from the hang rods 32, 33, and 34. The machinery boxes 35 and 36 disposed at opposite ends of the cabinet 30 have the function of positioning the hang rods 32, 33, and 34 to selectively bring them opposite the opening 31 by moving them around a fixed path.

Referring to Figures 3 through 14, inclusive, the hang rods 32, 33, and 34 are carried over the upper horizontal section of their rectangular path of travel by the track unit 37, and over the lower horizontal leg by the track 38. The path of travel of the hang rods over the vertical sections of the circuit is established by the combined action of the strips 39 and 40 (refer to Figure 13 on sheet 8) and by the presence of the chain 41. Chain rails 42 and 43 back up the chain 41 over the vertical legs so as to prevent deflection of the chain from a straight line between the sprockets. The corners of the path of travel of the chain are established by the sprockets 44, 45, 46, and 47. These sprockets are mounted upon the shafts 48, 49, 50, and 51. The support of these shafts is provided by the upper bracket 52 (supporting both of the upper sprockets), and the lower bracket 53 (supporting the lower two sprockets).

The spring members 54, 55, 56, and 57 adjacent the four corners of the rectangular path of travel of the hang rods establish positions for the hang rods which will be maintained until they are forceably disengaged by the action of the chain attachments. Two sets of these chain attachments are provided at diametrically opposite points on the chain 41. These attachments both include the rotatable wheel units 58 that are restrained to a direction of rotation opposite to the angular direction of movement of the chain 41 about its circuit by the action of the dogs 59. These dogs are pivotally mounted upon extended chain pins 60, and are biased toward the wheel units 58 by the action of the springs 61a and 61b (see Figure 4 on sheet 4). The wheel units 58 include the similar inner and outer members 62a and 62b, respectively, mounted on the shaft 63. These members are provided with the radial extensions 62c and 62d, respectively, which are adapted to act as abutments on being engaged by a hang rod from a particular direction. The shaft 63 is carried by the chain 41. The ratchet wheels 64a and 64b are attached to the wheel members 62a and 62b, respectively. With this arrangement, action of the dog 59 under the biasing of the springs 61a and 61b limits the direction of rotation of the wheel units 62a and 62b to a direction of rotation opposite to that of the angular movement of the chain 41.

The chain attachment 65 (refer to Figure 5 on sheet 4, and to Figure 16 on sheet 1) is pivotally mounted on the pin 66 of the chain 41. The attachment 65 is formed from the side panels 67a and 67b connected by the transverse panel 68, which actually provides the engaging surface, or abutment, that cooperates with the various hang rods. The lug 69 is positioned to act against the opposite side of the chain 41 (from the transverse panel 68) to limit the clockwise rotation of the attachments caused by the influence of gravity. The pin 70 projects from the side of the attachment 65 and is adapted to cooperate with the inner rail 71. The varying contour of the rail 71 with respect to the path of movement of the chain 41 will cause the attachment 65 to rotate to and from a position in which the engaging surface 68 will cooperate with the various hang rods.

Figure 9:
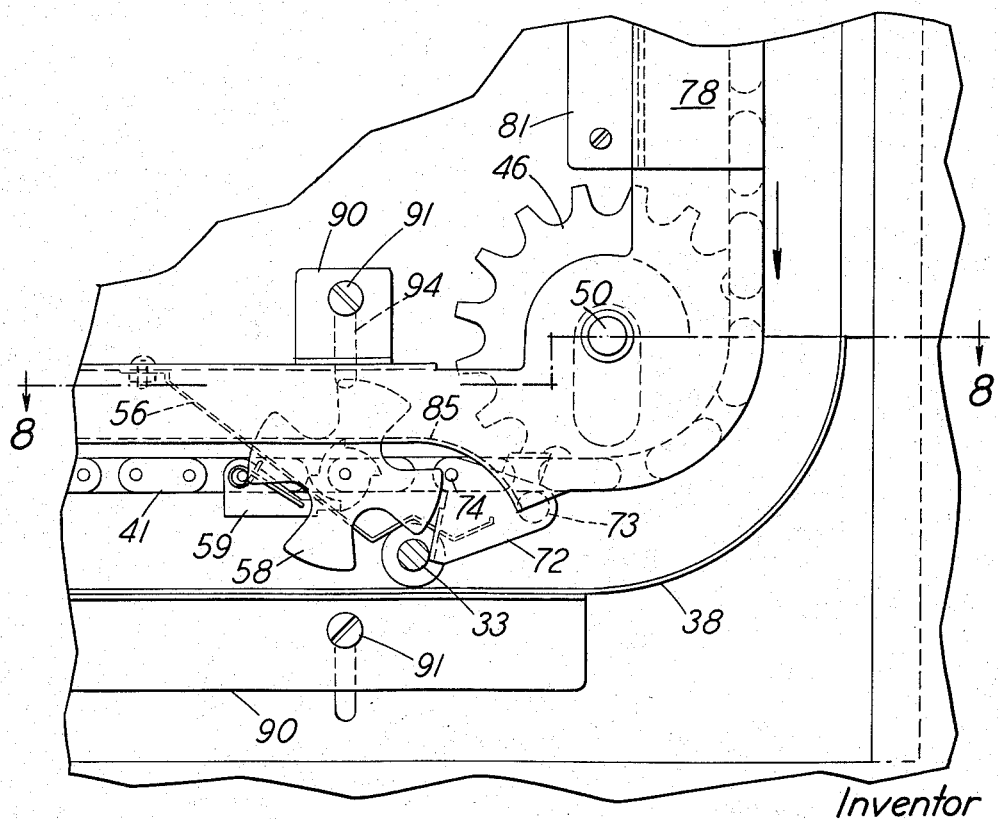
Figure 9 (see sheet 6) is a view in elevation of the same mechanism shown in Figure 8.
Figure 10:
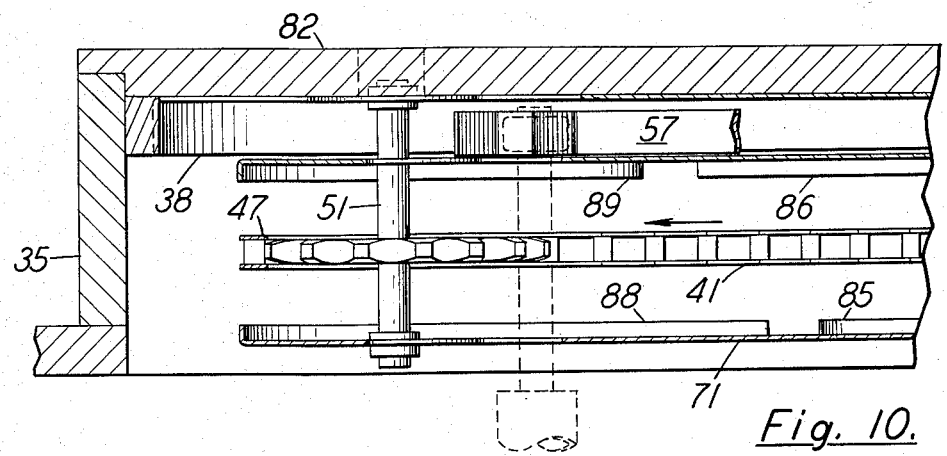
Figure 10 (see sheet 7) is an enlarged top view of the mechanism shown at the lower left corner of Figure 3.
Figure 11:
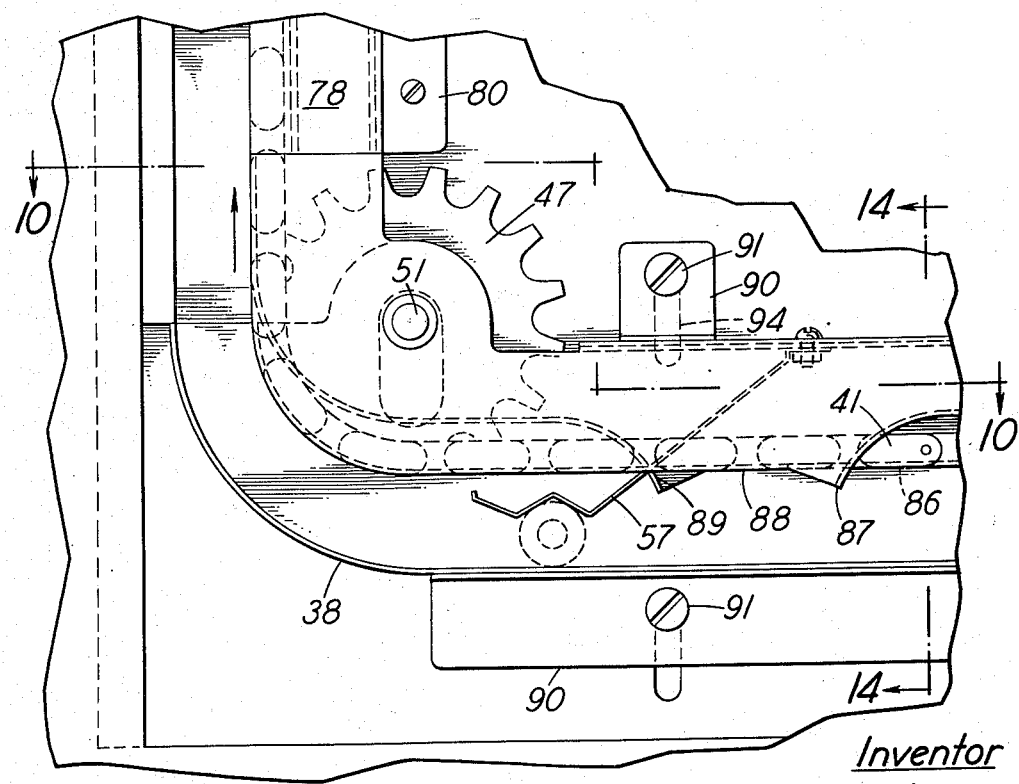
Figure 11 (see sheet 7) is a view in elevation of the mechanism shown in Figure 10.
Figure 14:
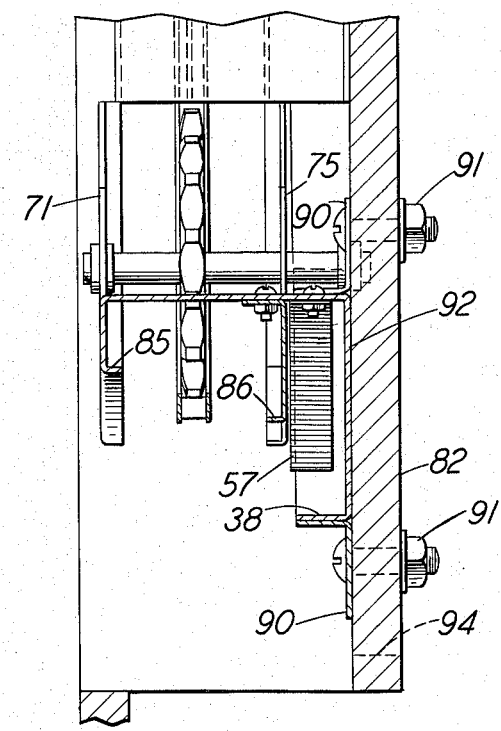
Figure 14 (see sheet 8) is a view taken on the plane 14—14 of Figure 11.
Figure 12:
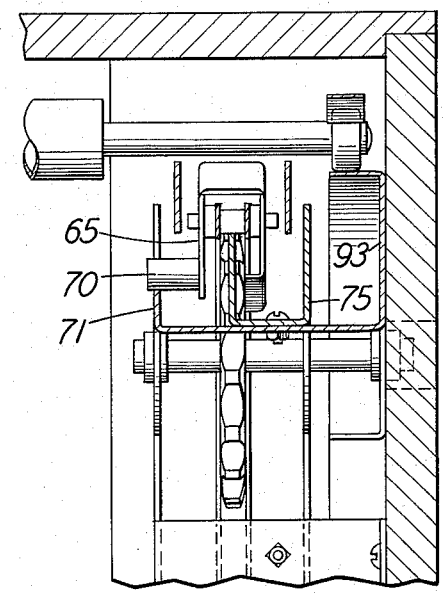
Figure 12 (see sheet 8) is a view taken on the plane 12—12 of Figure 5.
Figure 13:
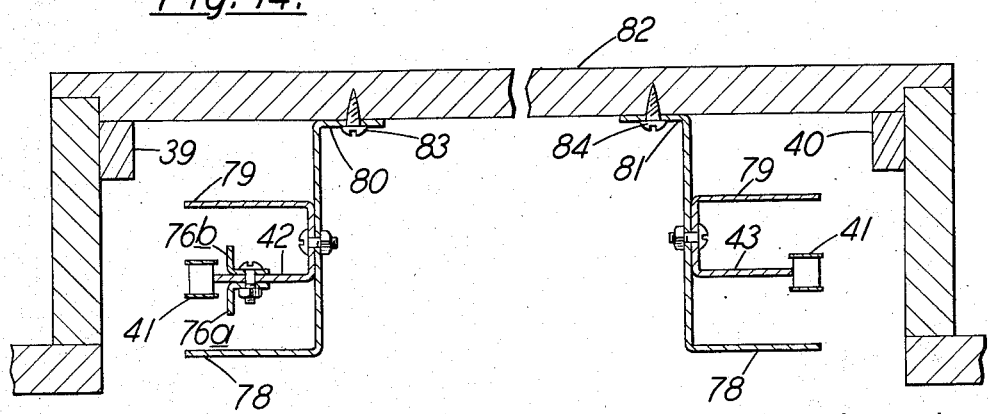
Figure 13 (see sheet 8) is a section taken on the plane 13—13 of Figure 3. This section is shown on an enlarged scale, and with a portion of the back of the machinery box broken away.

The chain attachment 72, which is diametrically opposite to the attachment 65, is essentially similar in construction, except for the provision of a pin 73 which projects in the opposite direction from the pin 70 of attachment 65 (see Figures 9 on sheet 6 and 15 on sheet 1). Attachment 72 is pivotally mounted on the chain 41 on the pin 74, and the angular position of the attachment 72 about the axis of the pin 74 is determined by the cooperation of the pin 73 with the outer track system 75. The attachment 65 is positioned by the inner track system; and it may be noted that it is placed in position to engage the hang rods at the upper right and lower left corners of the mechanism shown in Figure 3. Conversely, the attachment 72 is positioned by the outer track system 75, and is placed in position to engage the hang rods at the upper left and lower right corners of the mechanism shown in Figure 3.

Over the rear vertical, or ascending, leg of the path of travel of the hang rods, the positioning action of the pin rails is augmented by the presence of the shelves 76a and 76b. These shelves are disposed to cooperate with the edges 11a and 11b respectively of the attachment 65 and thereby aid in maintaining the position of the attachment 65 over the ascending vertical leg. It may be noted that the inner and outer track units 71 and 75, respectively, are continuous over the vertical legs of the path of travel due to the presence of the inner vertical rail components 78 and outer vertical rail components 79. The vertical rail structure is preferably formed so as to provide the mounting brackets 80 and 81 which are secured to the back 82 of the machinery box by screws such as are indicated at 83 and 84 (see Figure 13 on sheet 8).

The formation of the lower horizontal sections of the rails 71 and 75 (see Figures 11 on sheet 7, 14 on sheet 8, and 9 on sheet 6) provides for elevating the attachment 65 from engaging position at the lower right corner, and maintaining the attachment 72 in engagement over the lower horizontal leg. At the lower left corner, referring to Figure 3, the attachment 65 is lowered into engaging position and the attachment 72 is removed therefrom. To accomplish this action, the inner and outer chain rails 71 and 75 are provided with the flanges 85 and 86, respectively (see Figure 14 on sheet 8). The flange 85 engages the pin 70 at the lower right corner of Figure 3 and rotates the attachments 65 out of engaging position. As this attachment approaches the lower left corner, the flange 85 permits the attachment to drop to engaging position out of the influence of the flange 85 at the point 87. The attachment 65 is then maintained in engaging position by the action of the flange 88 while a hang rod which has been held at that corner by the spring member 57 is moved around to the vertical ascending section of the path of travel. This same action is accompanied by the release of the pin 73 from the flange 86, and the engagement of this pin by the flange 89 which causes the attachment 72 to be elevated out of engaging position. A hang rod moved to the rear over the lower section of the path of travel by attachment 72 will therefore be left under the influence of the spring member 57 until it is picked up by the following chain attachment 65.

The lower rail and track assembly is carried on a structure which includes the angle brackets 90 secured to the back 82 of the machinery box by fastenings as are indicated at 91. The inner ends of the sprocket shafts are carried in suitable apertures in extensions of the inner rail unit 71, and the opposite ends of the shafts are mounted upon the plate 92 (for the lower sprockets) which is formed integrally with the structure providing the rail 38. The upper sprockets are likewise carried at their inner ends by extensions of the rail assembly 71, and at their outer ends are supported by sections formed integrally with the plate 93. It may be noted that the angle brackets 90 are capable of vertical movement with respect to the machinery box by virtue of the slots 94 which receive the fastenings 91. This arrangement permits adjustment of chain tension.

Figure 6:
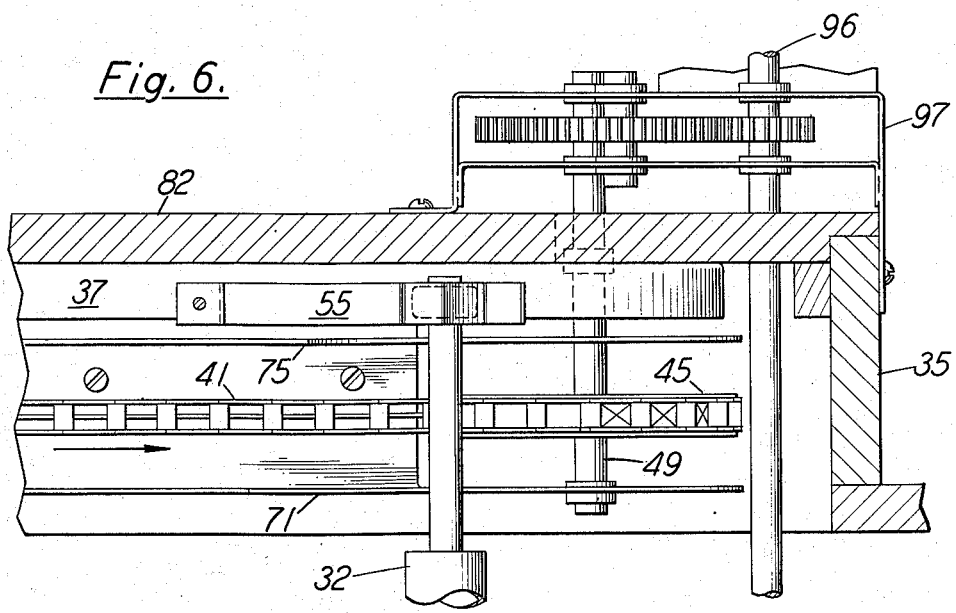
Figure 6 (see sheet 5) is an enlarged plan view of the mechanism associated with the upper right corner of the shifting mechanism shown in Figure 3.
Figure 7:
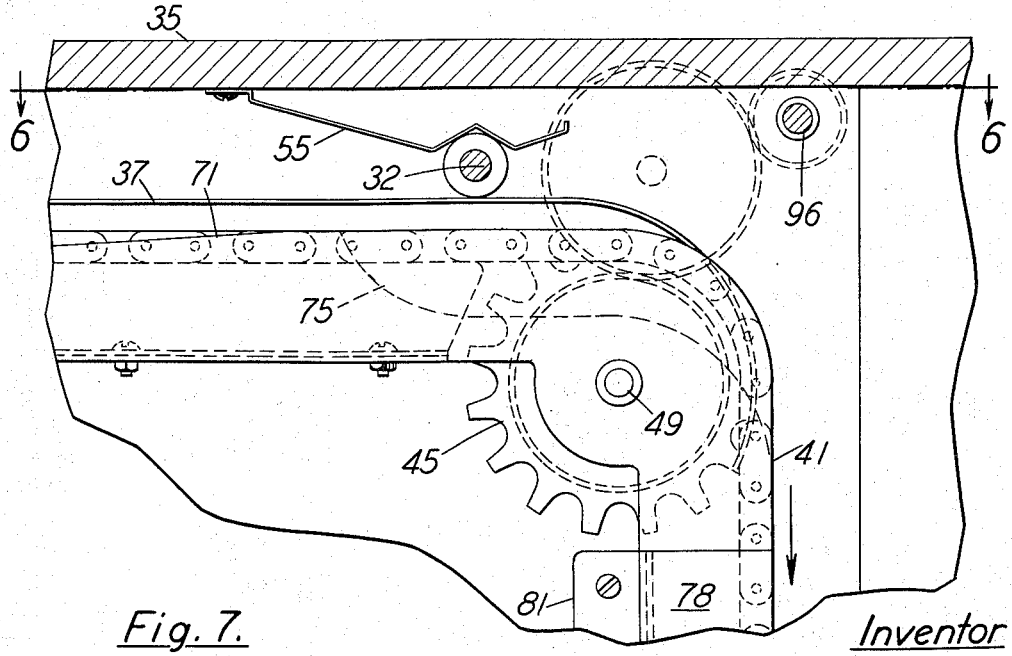
Figure 7 (see sheet 5) is a view in elevation of the same mechanism shown in Figure 6.
Figure 8:
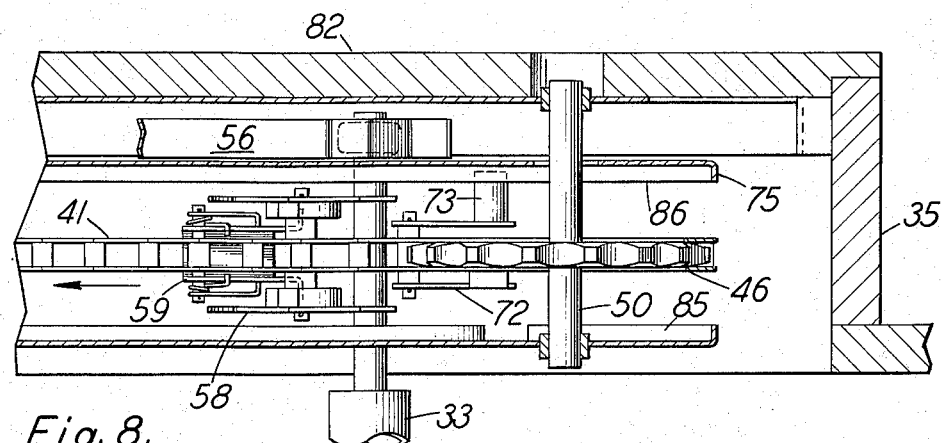
Figure 8 (see sheet 6) is an enlarged top view of the mechanism associated with the lower right corner of Figure 3.

Referring to Figures 6 and 7 on sheet 5, the driving mechanism for supplying power to the machinery boxes includes a motor 95 (shown in Figure 2 on sheet 2) adapted to drive a shaft 96. The shaft 96 extends from machinery box 35 across the length of the cabinet 30 to drive the related machinery box 36. In both cases, a suitable gear train contained within a housing as indicated at 97 operates to transfer power from the shaft 96 to the sprocket and chain system through a shaft as indicated at 49. To protect the wearing apparel in the cabinet from contact with the shifting mechanism, it is preferred to provide the shield panels 98 (see Figure 1 on sheet 1) at each end of the hang rods. These panels are shown, described, and claimed in my co-pending application Serial Number 214,186 previously referred to.

The cycle of movement established by this system is indicated in Figures 17 through 21, inclusive, on sheet 9. For convenience, a series of three hang rods is designated in each of these views a, b, and c. In Figure 17, the chain attachment d is positioned by a rail to engage the hang rod c. This same attachment will become disengaged at the lower left corner of the path of chain travel as shown in Figure 18. This same chain attachment will be inactive until it approaches the upper left corner of the path of movement at which time the rail system will cause it to engage whichever hang rod is present at that location. The movement of the attachment d to the lower left corner of course causes movement of the attachment e to the upper right corner, and the rail associated therewith brings it to the position to engage the hang rod b (Figure 18). Further movement of the chain causes the hang rod b to be shoved over the upper right corner, after which it will drop into engagement with the wheel unit associated with the attachment e. Continued movement of the chain results in lowering the hang rod b to the lower right corner to the position shown in Figure 19, after which the attachment e becomes disengaged. The same movement causes the attachment d to reach the upper left corner, and move into engaging position where the hang rod a is encountered.

Further movement of the chain causes the hang rod a to be moved to the upper right corner and brings the attachment e to a position for engaging the hang rod c. Continued movement of the chain elevates the hang rod c to the upper left corner, and brings the attachment d to a position for engaging the hang rod b. It will be noted that the general pattern of arrangement of the hang rods a, b, and c is the same in Figure 21 as it is in Figure 17, except for a change in sequence. Continued operation of the mechanism in this fashion will result in bringing each one of the hang rods opposite the opening 31 of the cabinet so that the material suspended from the rods can be examined and removed.

The particular embodiments of the present invention which have been illustrated in the accompanying drawings and are discussed herein are for illustrative purposes only and are not to be considered as a limitation upon the scope of the appended claims. In these claims, it is my intention to claim the entire invention to which I am entitled in view of the prior art.

I claim:

1. In a storage and display cabinet having track means disposed in a rectangular closed circuit in a vertical plane, article-supporting means including three rod means each provided with means for engaging said track means, endless flexible tension transmitting means, guide means for said tension transmitting means establishing a path of movement thereof substantially parallel to said closed circuit, and drive means for said tension transmitting means establishing a direction of movement thereof, the combination comprising: first and second rod-engaging means carried by said tension transmitting means, said first and second rod-engaging means each including first abutment means adapted to apply force to said rod means only in a direction opposite to the direction of movement of said tension transmitting means, and also including second abutment means, said second abutment means being positioned behind said first abutment means and laterally movable with respect to said tension transmitting means to and from rod-engaging position; and first and second rail means disposed to bear against a portion of the second abutment means of said first and second rod-engaging means respectively to laterally position the same, said first and second rail means being formed to cause engagement of only one of said second abutment means at particular diametrically opposite corners of said closed circuit, and the other of said second abutment means at the other diametrically opposite corners.

2. In a storage and display cabinet having article-supporting means including three rod means each provided with means for engaging track means, endless flexible tension transmitting means, guide means for said tension transmitting means establishing a rectangular path of movement in a vertical plane, track means for said rod means substantially parallel to at least the horizontal sections of said path of movement, and drive means for said tension means establishing a direction of movement thereof, the combination comprising: first and second rod-engaging means carried by said tension transmitting means, said first and second rod-engaging means each including first abutment means adapted to apply force to said rod means only in a direction opposite to the direction of movement of said tension transmitting means, and also including second abutment means, said second abutment means being positioned behind said first abutment means and laterally movable with respect to said tension transmitting means to and from rod-engaging position; and first and second rail means disposed to bear against a portion of the second abutment means of said first and second rod-engaging means respectively to laterally position the same, said first and second rail means being formed to cause engagement of only one of said second abutment means at particular diametrically opposite corners of said path of movement, and the other of said second abutment means at the other diametrically opposite corners.

3. In a storage and display cabinet having track means disposed in a closed circuit, article-supporting means including rod means provided with means for engaging said track means, endless flexible tension transmitting means, guide means for said tension transmitting means establishing a path of movement thereof substantially parallel to said closed circuit, and drive means for said tension transmitting means establishing a direction of movement thereof, the combination comprising: first and second rod-engaging means carried by said tension transmitting means, said first and second rod-engaging means each including wheel means having radially projecting abutment means and ratchet means restricting the rotation of said wheel means to a direction opposite to the angular direction of movement of said tension transmitting means around said path of movement, and also including second abutment means, said second abutment means being positioned behind said first abutment means and laterally movable with respect to said tension transmitting means to and from rod-engaging position; and first and second rail means disposed to bear against a portion of the second abutment means of said first and second rod-engaging means respectively to laterally position the same, said first and second rail means being formed to cause engagement of only one of said second abutment means over a particular section of said closed circuit.

4. In a storage and display cabinet having track means disposed in a closed circuit, article-supporting means including rod means provided with means for engaging said track means, endless flexible tension transmitting means, guide means for said tension transmitting means establishing a path of movement thereof substantially parallel to said closed circuit, and drive means for said tension transmitting means establishing a direction of movement thereof, the combination comprising: first and second rod-engaging means carried by said tension transmitting means, said first and second rod-engaging means each including first abutment means adapted to apply force to said rod means only in a direction opposite to the direction of movement of said tension transmitting means, and also including second abutment means, said second abutment means being positioned behind said first abutment means and laterally movable with respect to said tension transmitting means to and from rod-engaging position; and first and second rail means disposed to bear against a portion of the second abutment means of said first and second rod-engaging means respectively to laterally position the same, said first and second rail means being formed to cause engagement of only one of said second abutment means over a particular section of said closed circuit.

5. In a storage and display cabinet having track means, article-supporting means including rod means provided with means for engaging said track means, endless flexible tension transmitting means, guide means for said tension transmitting means establishing a path of movement having sections thereof substantially parallel to said track means, and drive means for said tension transmitting means establishing a direction of movement thereof, the combination comprising: first and second rod-engaging means carried by said tension transmitting means, said first and second rod-engaging means each including first abutment means adapted to apply force to said rod means only in a direction opposite to the direction of movement of said tension transmitting means, and also including second abutment means, said second abutment means being positioned behind said first abutment means and laterally movable with respect to said tension transmitting means to and from rod-engaging position; and first and second rail means disposed to bear against a portion of the second abutment means of said first and second rod-engaging means respectively to laterally position the same, said first and second rail means being formed to cause engagement of only one of said second abutment means over a particular section of said path of movement.

6. In a storage and display cabinet having article-supporting means including rod means provided with means for engaging said track means, endless flexible tension transmitting means, guide means for said tension transmitting means establishing a rectangular path of movement thereof in a vertical plane, and drive means for said tension transmitting means establishing a direction of movement thereof, the combination comprising: rod-retaining means adapted to hold the weight of said rod means independently of said tension transmitting means at points adjacent the four corners of said path of movement; first and second rod-engaging means carried by said tension transmitting means, said first and second rod-engaging means each including first abutment means adapted to apply force to said rod means only in a direction opposite to the direction of movement of said tension transmitting means, and also including second abutment means, said second abutment means being positioned behind said first abutment means and laterally movable with respect to said tension transmitting means to and from rod-engaging position; and first and second rail means disposed to bear against a portion of the second abutment means of said first and second rod-engaging means respectively to laterally position the same, said first and second rail means being formed to cause engagement of one and disengagement of the other of said second abutment means at particular diametrically opposite retaining means, and opposite engagement and disengagement of said second abutment means at the remaining diametrically opposite retaining means.

7. In a storage and display cabinet having article-supporting means including rod means provided with means for engaging said track means, endless flexible tension transmitting means, guide means for said tension transmitting means establishing a path of movement thereof, and drive means for said tension transmitting means establishing a direction of movement thereof, the combination comprising: rod-retaining means adapted to hold the weight of said rod means at at least one point on said path of movement independently of said tension transmitting means; first and second rod-engaging means carried by said tension transmitting means, said first and second rod-engaging means each including first abutment means adapted to apply force to said rod means only in a direction opposite to the direction of movement of said tension transmitting means, and also including second abutment means, said second abutment means being positioned behind said first abutment means and laterally movable with respect to said tension transmitting means to and from rod-engaging position; and first and second rail means disposed to bear against a portion of the second abutment means of said first and second rod-engaging means respectively to laterally position the same, said first and second rail means being formed to cause engagement of one and disengagement of the other of said second abutment means at said point where said rod-retaining means positions said rod means.

WILLIAM BRONSON LYON.

References Cited in the file of this patent
UNITED STATES PATENTS

| Number | Name | Date |
|---|---|---|
| 893,563 | Basler | July 14, 1908 |
| 1,047,904 | Beinhoff | Dec. 17, 1912 |
| 2,260,528 | Levy | Oct. 28, 1941 |
| 2,395,947 | Walker | Mar. 5, 1946 |
| 2,513,502 | Lyon | July 4, 1950 |